US012518577B2

(12) United States Patent
Abbas et al.

(10) Patent No.: US 12,518,577 B2
(45) Date of Patent: Jan. 6, 2026

(54) METHOD AND SYSTEM FOR GENERATING AND DISPLAYING INSIGHTS BASED ON VEHICLE DATA

(71) Applicant: The Toronto-Dominion Bank, Toronto (CA)

(72) Inventors: Mohamed Abbas, Jersey City, NJ (US); Levi Sutter, Westampton, NJ (US); Lina Nancy Siciliano, Voorhees, NJ (US); Marcus Edward Furlong, Sandy Springs, GA (US); Robert Setlight, Robbinsville, NJ (US); Richard Bruce Johnson, Cape Elizabeth, ME (US); Lino Catana, Medford, NJ (US)

(73) Assignee: The Toronto-Dominion Bank, Toronto (CA)

( * ) Notice: Subject to any disclaimer, the term of this patent is extended or adjusted under 35 U.S.C. 154(b) by 130 days.

(21) Appl. No.: 18/320,328

(22) Filed: Jun. 8, 2023

(65) Prior Publication Data

US 2024/0412573 A1 Dec. 12, 2024

(51) Int. Cl.
*G07C 5/00* (2006.01)
*G07C 5/08* (2006.01)

(52) U.S. Cl.
CPC ........... *G07C 5/0825* (2013.01); *G07C 5/008* (2013.01)

(58) Field of Classification Search
CPC .............................. G07C 5/0825; G07C 5/008

USPC ......................................................... 340/438
See application file for complete search history.

(56) References Cited

U.S. PATENT DOCUMENTS

| | | | |
|---|---|---|---|
| 9,619,945 B2 | 4/2017 | Adderly et al. | |
| 10,140,645 B2* | 11/2018 | Driscoll | G06Q 30/0631 |
| 10,713,862 B2 | 7/2020 | Slusar | |
| 11,397,092 B2* | 7/2022 | DeLuca | G01C 21/3415 |
| 2016/0311410 A1 | 10/2016 | Donzis et al. | |
| 2018/0018007 A1* | 1/2018 | Dorn | B60L 53/65 |
| 2019/0186934 A1* | 6/2019 | Lee | G01C 21/3617 |
| 2019/0295189 A1 | 9/2019 | Strasser | |
| 2021/0056443 A1 | 2/2021 | Bradley et al. | |
| 2022/0412758 A1* | 12/2022 | Lv | G01C 21/3682 |
| 2024/0257575 A1* | 8/2024 | Liu | B60L 1/00 |
| 2025/0187472 A1* | 6/2025 | Eriksson | G01R 31/392 |

* cited by examiner

*Primary Examiner* — Naomi J Small
(74) *Attorney, Agent, or Firm* — Rowand LLP

(57) ABSTRACT

A server computer system having a communications module; at least one processor coupled to the communications module; and a memory coupled to the at least one processor, the memory storing processor-executable instructions which, when executed by the at least one processor, configure the at least one processor to provide a mobile application to a computing device that allows communication with the computing device to obtain, from an onboard system of a vehicle, vehicle data; obtain insight data based on at least some of the vehicle data; generate at least one insight based on at least one of the insight data or the vehicle data; and trigger display of the at least one insight on a display screen of the vehicle. A machine learning module may be engaged to estimate a cost of the at least one insight.

20 Claims, 12 Drawing Sheets

METHOD AND SYSTEM FOR GENERATING AND DISPLAYING INSIGHTS BASED ON VEHICLE DATA

TECHNICAL FIELD

The present application relates to methods and systems for generating and displaying insights based on vehicle data.

BACKGROUND

Vehicles often have onboard systems that include a computer device. The computer device may be adapted to process vehicle data to determine the condition of vehicle systems, parts, and lubricants.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

Figure 1:
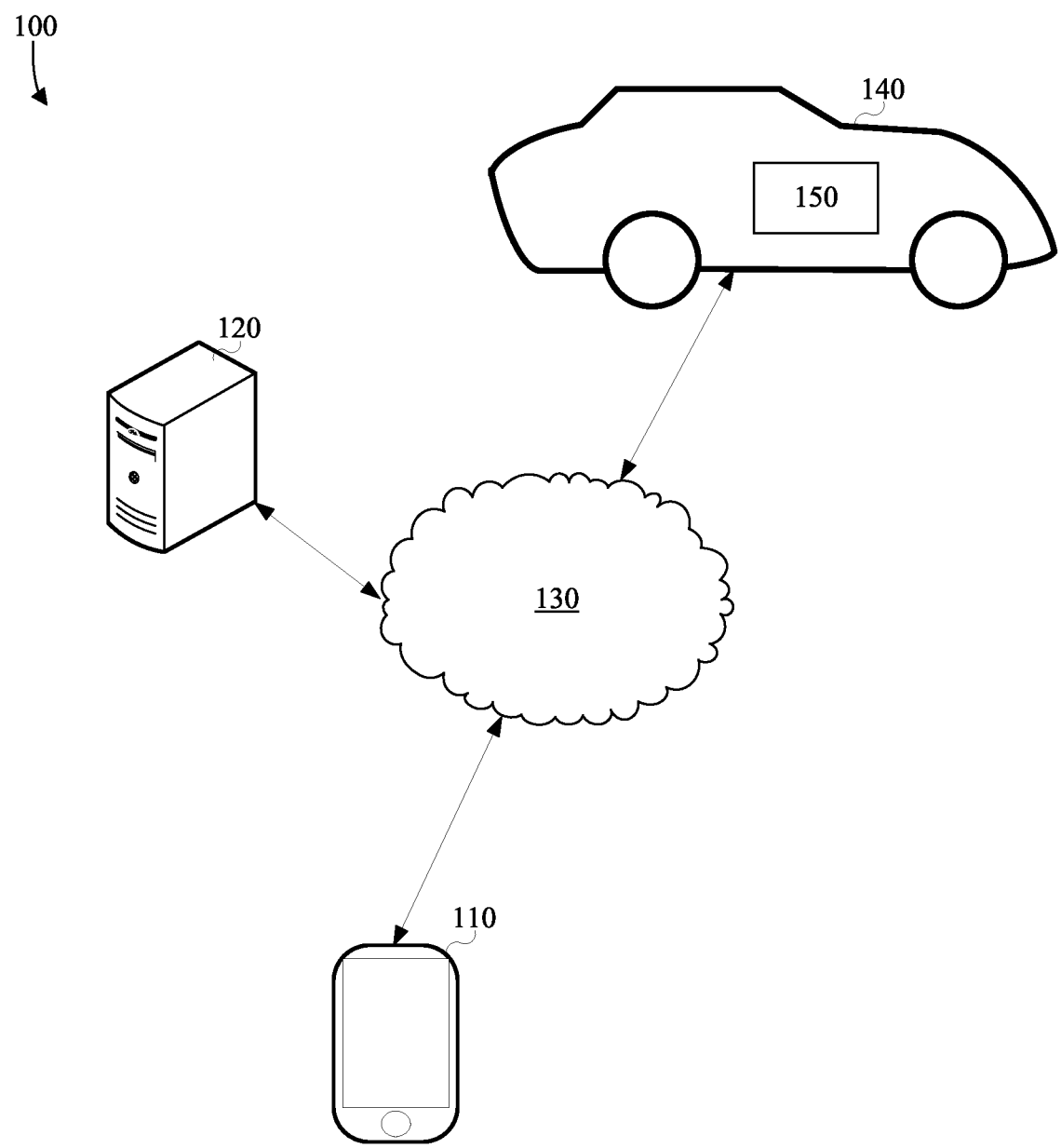
FIG. 1 is a schematic operation diagram illustrating an operating environment of an example embodiment.

Accordingly, in one aspect there is provided a server computer system comprising a communications module; at least one processor coupled to the communications module; and a memory coupled to the at least one processor, the memory storing processor-executable instructions which, when executed by the at least one processor, configure the at least one processor to provide a mobile application to a computing device that allows communication with the computing device to obtain, from an onboard system of a vehicle, vehicle data; obtain insight data based on at least some of the vehicle data; generate at least one insight based on at least one of the insight data or the vehicle data; and trigger display of the at least one insight on a display screen of the vehicle.

In one or more embodiments, when obtaining the insight data, the instructions, when executed by the at least one processor, configure the at least one processor to send, via the communications module and to a third party server computer system, the at least some of the vehicle data and a request for the insight data; and receive, via the communications module and from the third party server computer system, the insight data.

In one or more embodiments, the server computer system communicates with the third party server computer system by way of an application programming interface associated with the third party server computer system.

In one or more embodiments, the instructions, when executed by the at least one processor, configure the at least one processor to analyze the vehicle data to identify at least one upcoming event for the vehicle; and obtain the insight data based on the at least one upcoming event for the vehicle.

In one or more embodiments, the at least one upcoming event for the vehicle includes at least one financial event for the vehicle and the insight data includes an estimated cost of the at least one financial event.

In one or more embodiments, the instructions, when executed by the at least one processor, configure the at least one processor to integrate the estimated cost into a resource budget based on resource data maintained by a database associated with the server computer system.

In one or more embodiments, the instructions, when executed by the at least one processor, configure the at least one processor to generate the at least one insight based on the at least one upcoming event for the vehicle and the insight data based on the at least one upcoming event for the vehicle.

In one or more embodiments, the instructions, when executed by the at least one processor, configure the at least one processor to analyze the vehicle data to identify a location of the vehicle; and generate the at least one insight based on the location of the vehicle.

In one or more embodiments, the display of the at least one insight on the display screen of the vehicle includes at least one selectable option that, when selected, causes the server computer system to perform an action.

In one or more embodiments, the vehicle data includes at least one of fuel data, diagnostic data, sensor data, location data, charging data, or driving data.

In one or more embodiments, the at least one insight includes at least one of an oil change for the vehicle, an upcoming service for the vehicle, charging the vehicle, filling the vehicle up with gasoline, or selling the vehicle and the insight data is associated with an estimated cost of the at least one insight.

According to another aspect there is provided a computer-implemented method performed by at least one processor of a computer server system, the method comprising providing a mobile application to a computing device that allows communication with the computing device to perform obtaining, from an onboard system of a vehicle, vehicle data; obtaining insight data based on at least some of the vehicle data; generating at least one insight based on at least one of the insight data or the vehicle data; and triggering display of the at least one insight on a display screen of the vehicle.

In one or more embodiments, when obtaining the insight data, the method further comprises sending, to a third party server computer system, the at least some of the vehicle data and a request for the insight data; and receiving, from the third party server computer system, the insight data.

In one or more embodiments, the server computer system communicates with the third party server computer system by way of an application programming interface associated with the third party server computer system.

In one or more embodiments, the method further comprises analyzing the vehicle data to identify at least one upcoming event for the vehicle; and obtaining the insight data based on the at least one upcoming event for the vehicle.

In one or more embodiments, the at least one upcoming event for the vehicle includes at least one financial event for the vehicle and the insight data includes an estimated cost of the at least one financial event.

In one or more embodiments, the method further comprises integrating the estimated cost into a resource budget based on resource data maintained by a database associated with the server computer system.

In one or more embodiments, the method further comprises generating the at least one insight based on the at least one upcoming event for the vehicle and the insight data based on the at least one upcoming event for the vehicle.

In one or more embodiments, the display of the at least one insight on the display screen of the vehicle includes at least one selectable option that, when selected, causes the server computer system to perform an action.

According to another aspect there is provided a non-transitory computer readable storage medium comprising computer-executable instructions which, when executed, configure at least one processor of a server computer system to provide a mobile application to a computing device that allows communication with the computing device to obtain, from an onboard system of a vehicle, vehicle data; obtain insight data based on at least some of the vehicle data; generate at least one insight based on at least one of the insight data or the vehicle data; and trigger display of the at least one insight on a display screen of the vehicle.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

In the present application, examples involving a general-purpose computer, aspects of the disclosure transform the general-purpose computer into a special-purpose computing device when configured to execute the instructions described herein.

In the present application, various functionalities discussed herein may be performed by a single processor or by any one of one or more processors, either alone or in combination.

FIG. 1 is a block diagram illustrating an operating environment of an example embodiment. Various components cooperate to provide a system 100 which may be used, for example, to trigger execution of a smart contract. As shown, the system 100 includes a computing device 110 and a server computer system 120 coupled to one another through a network 130.

The computing device 110 is configured to communicate with the server computer system 120 via the network 130 and vice-versa. The computing device 110 may be remote from the server computer system 120.

The computing device 110 may be a mobile device as shown in FIG. 1. However, the computing device 110 may be a computing device of another type such as for example a laptop computer, a personal computer, a tablet computer, a notebook computer, a hand-held computer, a smart speaker, a personal digital assistant, a portable navigation device, a mobile phone, a wearable computing device (e.g., a smart watch, a wearable activity monitor, wearable smart jewelry, and glasses and other optical devices that include optical head-mounted displays), an embedded computing device (e.g., in communication with a smart textile or electronic fabric), and any other type of computing device that may be configured to store data and software instructions, and execute software instructions to perform operations consistent with disclosed embodiments.

The server computer system 120 is a computer server system. A computer server system may, for example, be a mainframe computer, a minicomputer, or the like. In some implementations thereof, a computer server system may be formed of or may include one or more computing devices. A computer server system may include and/or may communicate with multiple computing devices such as, for example, database servers, computer servers, and the like. Multiple computing devices such as these may be in communication using a computer network and may communicate to act in cooperation as a computer server system. For example, such computing devices may communicate using a local-area network (LAN). In some embodiments, a computer server system may include multiple computing devices organized in a tiered arrangement. For example, a computer server system may include middle tier and back-end computing devices. In some embodiments, a computer server system may be a cluster formed of a plurality of interoperating computing devices.

The server computer system 120 may be an application server. The mobile application may be resident on the computing device 110 and may allow the server computer system 120 to communicate with the computing device 110. For example, the mobile application may present one or more graphical user interfaces on a display screen of the computing device 110 that may allow the server computer system 120 to communicate with the computing device 110.

The server computer system 120 may additionally or alternatively be a financial institution server and may maintain a database that includes various data records. At least some of the data records may be associated with customer bank accounts and/or customer credit card accounts. For example, a data record may store resource data that may reflect an amount of resources stored in a customer's bank account. At least some of the data records may include resource budget data based on resource data maintained by the database. The resource budget data may include resource budget data that defines a resource budget for a customer. At least some of the data records may include additional account data such as for example the name, age, address of the customer, etc. and the account data may be associated with the customer bank accounts and/or customer credit card accounts.

As will be described in more detail below, the server computer system 120 may communicate with one or more third party computer systems to obtain insight data. The server computer system 120 may communicate directly with the one or more third party computer systems or may communicate with the one or more third party computer systems by way of an application programming interface associated therewith.

The network 130 is a computer network. The network 130 may include a public network such as the Internet and/or a private network. In some embodiments, the network 130 may be an internetwork such as may be formed of one or more interconnected computer networks. For example, the network 130 may be or may include an Ethernet network, a wireless network, a telecommunications network, or the like.

The system 100 includes a vehicle 140. The vehicle 140 may be any vehicle such as for example a car, a truck, a van, a minivan, a motorcycle, etc. The vehicle 140 includes an onboard system 150. The onboard system 150 generates vehicle data and includes a computer device and one or more sensors that are adapted to communicate sensor data to the computer device. The computer device may be adapted to continuously process sensor data to determine the condition of vehicle systems, parts, and lubricants. Types of vehicle data that may be generated by the onboard system 150 may include fuel data, diagnostic data, sensor data, location data, driving data, etc. The onboard system 150 may additionally include a display screen that may be adapted to display graphical user interfaces associated with one or more vehicle features such as for example to control audio, etc.

As will be described in more detail below, the computing device 110 may connect to the onboard system 150 and may cause the display screen of the vehicle to display one or more graphical user interfaces. The onboard system 150 may communicate the vehicle data to the computing device 110.

FIG. 1 illustrates an example representation of components of the system 100. The system 100 can, however, be implemented differently than the example of FIG. 1. For example, various components that are illustrated as separate systems in FIG. 1 may be implemented on a common system. By way of further example, the functions of a single component may be divided into multiple components.

Figure 2:
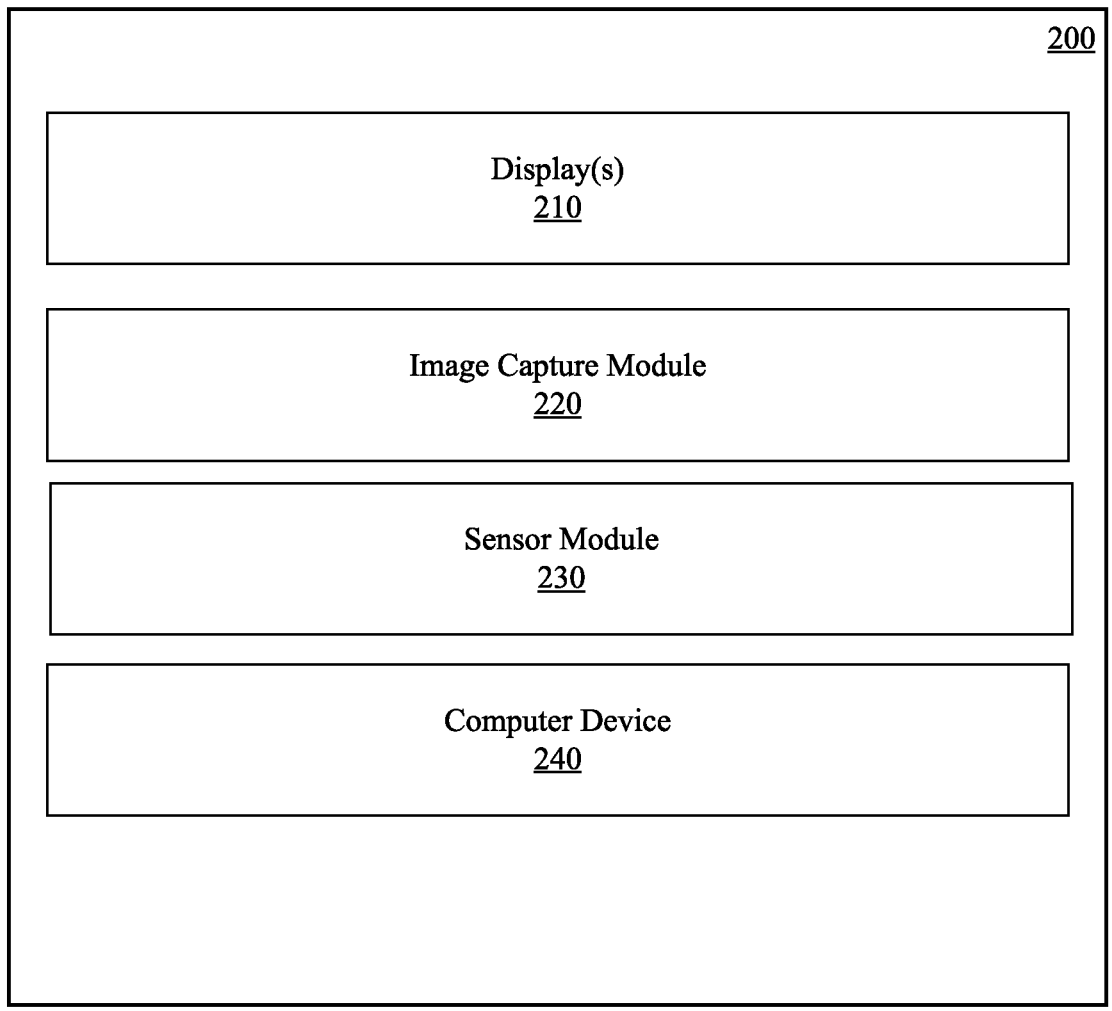
FIG. 2 is a simplified schematic diagram showing components of a computing device of an example embodiment.

FIG. 2 is a simplified schematic diagram showing components of an exemplary computing device 200. The computing device 110 may be of the same type as computing device 200. The computing device 200 may include modules including, as illustrated, for example, one or more displays 210, an image capture module 220, a sensor module 230, and a computer device 240.

The one or more displays 210 are a display module. The one or more displays 210 are used to display screens of a graphical user interface that may be used, for example, to communicate with the server computer system 120 (FIG. 1). The one or more displays 210 may be internal displays of the computing device 200 (e.g., disposed within a body of the computing device).

The image capture module 220 may be or may include a camera. The image capture module 220 may be used to obtain image data, such as images. The image capture module 220 may be or may include a digital image sensor system as, for example, a charge coupled device (CCD) or a complementary metal-oxide-semiconductor (CMOS) image sensor.

The sensor module 230 may be a sensor that generates sensor data based on a sensed condition. By way of example, the sensor module 230 may be or include a location subsystem which generates location data indicating a location of the computing device 200. The location may be the current geographic location of the computing device 200. The location subsystem may be or include any one or more of a global positioning system (GPS), an inertial navigation system (INS), a wireless (e.g., cellular) triangulation system, a beacon-based location system (such as a Bluetooth low energy beacon system), or a location subsystem of another type.

The computer device 240 is in communication with the one or more displays 210, the image capture module 220, and the sensor module 230. The computer device 240 may be or may include one or more processors which are coupled to the one or more displays 210, the image capture module 220, and/or the sensor module 230.

The computing device 200 may include additional modules. For example, the computing device 200 may include an I/O module. The I/O module is an input module and an output module. The I/O module may include or may be in communication with a microphone and a speaker. The microphone may include one or more microphones which may, for example, form a microphone array. The microphone may be employed for capturing acoustic signals from the environment proximate the computing device 200. The speaker may include one or more speakers for providing acoustic signals to the environment proximate the computing device 200. In summary, the I/O module may allow the computing device 200 to receive input via a microphone and provide output via a speaker.

Figure 3:
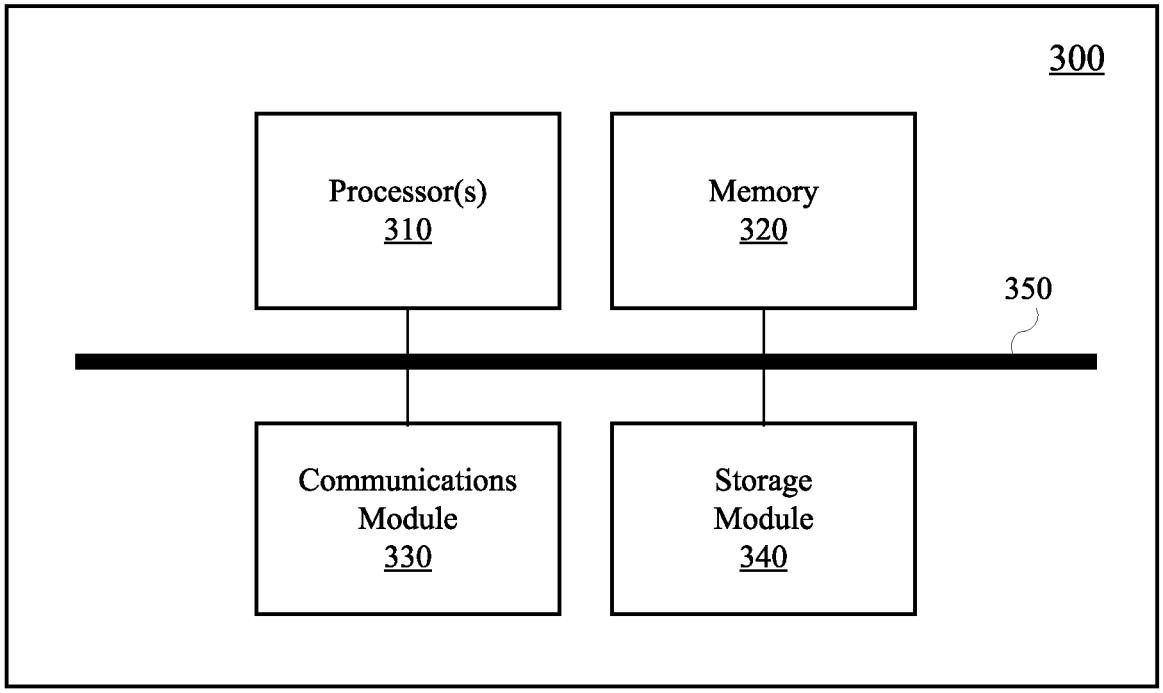
FIG. 3 is a high-level schematic diagram of an example computer device.

Referring now to FIG. 3, a high-level operation diagram of an example computer device 300 is shown. In some embodiments, the computer device 300 may be exemplary of the computer device 240 (FIG. 2), the computer device of the onboard system 150 of the vehicle 140, and/or the server computer system 120.

The example computer device 300 includes a variety of modules. For example, as illustrated, the example computer device 300 may include one or more processors 310, a memory 320, a communications module 330, and/or a storage module 340. As illustrated, the foregoing example modules of the example computer device 300 are in communication over a bus 350.

The one or more processors 310 are hardware processors. The one or more processors 310 may, for example, be one or more ARM, Intel x86, PowerPC processors or the like.

The memory 320 allows data to be stored and retrieved. The memory 320 may include, for example, random access memory, read-only memory, and persistent storage. Persistent storage may be, for example, flash memory, a solid-state drive or the like. Read-only memory and persistent storage are non-transitory computer-readable storage mediums. A computer-readable medium may be organized using a file system such as may be administered by an operating system governing overall operation of the example computer device 300.

The communications module 330 allows the example computer device 300 to communicate with other computer or computing devices and/or various communications networks. For example, the communications module 330 may allow the example computer device 300 to send or receive communications signals. Communications signals may be sent or received according to one or more protocols or according to one or more standards. For example, the communications module 330 may allow the example computer device 300 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 330 may allow the example computer device 300 to communicate using near-field communication (NFC), via Wi-Fi™, using Bluetooth™ or via some combination of one or more networks or protocols. In some embodiments, all or a portion of the communications module 330 may be integrated into a component of the example computer device 300. For example, the communications module may be integrated into a communications chipset. In some embodiments, the communications module 330 may be omitted such as, for example, if sending and receiving communications is not required in a particular application.

The storage module 340 allows the example computer device 300 to store and retrieve data. In some embodiments, the storage module 340 may be formed as a part of the memory 320 and/or may be used to access all or a portion of the memory 320. Additionally or alternatively, the storage module 340 may be used to store and retrieve data from persisted storage other than the persisted storage (if any) accessible via the memory 320. In some embodiments, the storage module 340 may be used to store and retrieve data in a database. A database may be stored in persisted storage. Additionally or alternatively, the storage module 340 may access data stored remotely such as, for example, as may be accessed using a local area network (LAN), wide area network (WAN), personal area network (PAN), and/or a storage area network (SAN). In some embodiments, the storage module 340 may access data stored remotely using the communications module 330. In some embodiments, the storage module 340 may be omitted and its function may be performed by the memory 320 and/or by the processor 310 in concert with the communications module 330 such as, for example, if data is stored remotely. The storage module may also be referred to as a data store.

Software comprising instructions is executed by the one or more processors 310 from a computer-readable medium. For example, software may be loaded into random-access memory from persistent storage of the memory 320. Additionally or alternatively, instructions may be executed by the one or more processors 310 directly from read-only memory of the memory 320.

Figure 4:
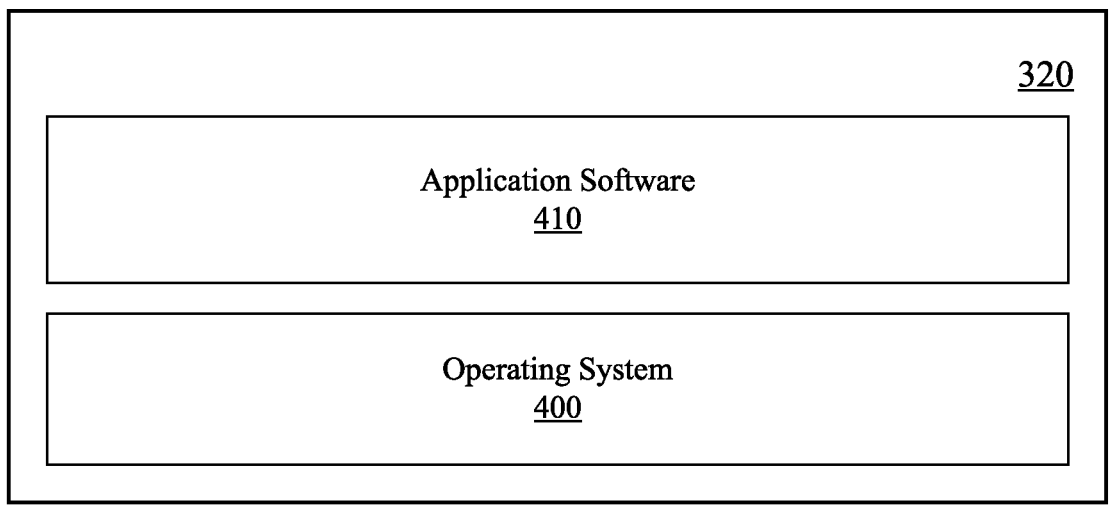
FIG. 4 shows a simplified organization of software components stored in a memory of the example computer device of FIG. 3.

FIG. 4 depicts a simplified organization of software components stored in the memory 320 of the example computer device 300 (FIG. 3). As illustrated, these software components include an operating system 400 and an application 410.

The operating system 400 is software. The operating system 400 allows the application 410 to access the one or more processors 310 (FIG. 3), the memory 320, and the communications module 330 of the example computer device 300 (FIG. 3). The operating system 400 may be, for example, Google™ Android™, Apple™ iOS™, UNIX™, Linux™, Microsoft™ Windows™, Apple OSX™ or the like.

The application 410 adapts the example computer device 300, in combination with the operating system 400, to operate as a device performing a particular function. For example, the application 410 may cooperate with the operating system 400 to adapt a suitable embodiment of the example computer device 300 to operate as the computer device 240 (FIG. 2), the computer device of the onboard system 150 of the vehicle 140, and/or the server computer system 120.

While a single application 410 is illustrated in FIG. 4, in operation the memory 320 may include more than one application 410 and different applications 410 may perform different operations. For example, in at least some embodiments in which the computer device 300 functions as the computing device 110, the applications 410 may include a banking application. The banking application may be configured for secure communications with the server computer system 120 and may provide various banking functions such as, for example, the ability to display a quantum of value in one or more data records (e.g., display balances), configure or request that operations such as transfers of value (e.g., bill payments, email money transfers and other transfers) be performed, and other account management functions.

By way of further example, in at least some embodiments in which the computer device 300 functions as the computing device 110, the applications 410 may include a web browser, which may also be referred to as an Internet browser. In at least some such embodiments, the server computer system 120 may be a web server. The web server may cooperate with the web browser and may serve as an interface when the interface is requested through the web browser. For example, the web browser may serve as a mobile banking interface. The mobile banking interface may provide various banking functions such as, for example, the ability to display a quantum of value in one or more data records (e.g., display balances), configure or request that operations such as transfers of value (e.g. bill payments and other transfers) be performed, and other account management functions.

By way of further example, in at least some embodiments in which the computer device 300 functions as the computing device 110, the applications 410 may include an insight generator application. The insight generator application may be enabled within the mobile banking application or may be a separate application. As will be described in more detail below, when the computing device 110 is connected to the onboard system 150 of the vehicle 140, the insight generator application may enable communication between the server computer system 120 and the onboard system 150 of the vehicle 140 (by way of the computing device 110). In this manner, the server computer system 120 may be adapted to obtain vehicle data from the onboard system 150 of the vehicle and may generate at least one insight based at least on the vehicle data.

The insight generator application (either alone or as a feature enabled within the mobile banking application) may be a mobile application that is adapted to be presented on the display screen of the onboard system 150 of the vehicle 140. For example, the insight generator application may be adapted to operate with an onboard system 150 such as for example Apple CarPlay. Specifically, the computing device 110 may connect to the onboard system 150 of the vehicle 140 using a short range wireless communication protocol such as for example Bluetooth™ or near-field communications (NFC) or may connect to the onboard system 150 using a cable such as a Lightning™ cable or a universal serial bus (USB) cable. Once connected, an icon associated with the insight generator application may be displayed on the display screen of the vehicle 140. A user may access the insight generator application by performing, for example, a tap gesture at a location on the display screen of the vehicle 140 that corresponds to the location of the icon associated with the insight generator application. In response, the computing device 110 may open the insight generator application and may cause the display screen of the vehicle 140 to display one or more graphical user interfaces associated with the insight generator application.

Figure 5:
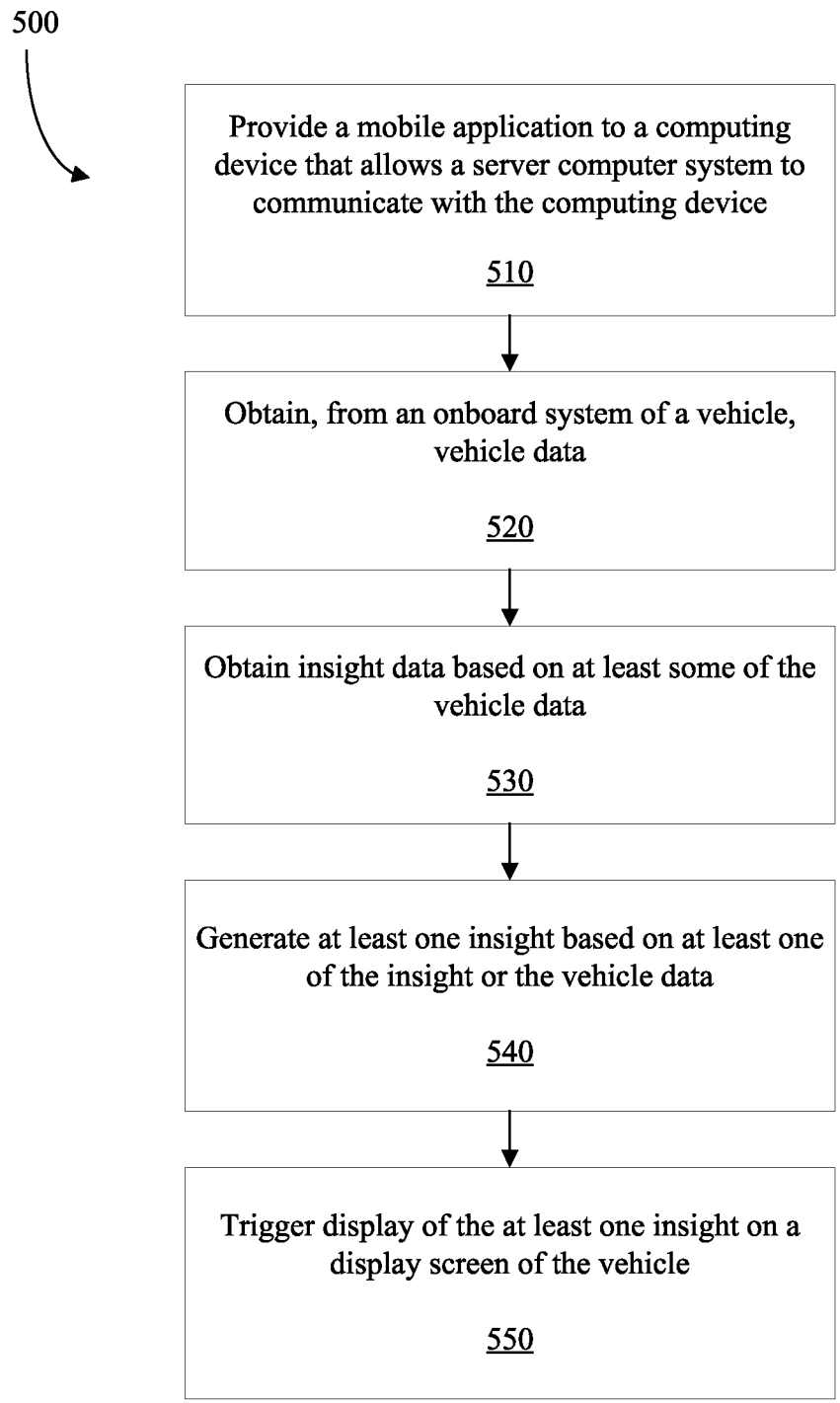
FIG. 5 is a flowchart showing operations performed by a server in generating and displaying insights based on vehicle data according to an embodiment.

The server computer system 120 may be adapted to generate insights based on vehicle data received from the onboard system 150 of the vehicle 140 and may be adapted to trigger display of at least one insight on the display screen of the vehicle 140. FIG. 5 is a flowchart showing computer operations of a method 500 which may be performed by the server computer system 120 to generate and display insights based on vehicle data. For example, computer-executable instructions stored in memory of the server computer system 120 may, when executed by one or more processors, configure the server computer system 120 to perform the method 500 or a portion thereof. It will be appreciated that the server computer system 120 may offload some of the operations to the computing device 110.

The method 500 includes providing a mobile application to a computing device that allows the server computer system to communicate with the computing device to perform the subsequent operations (step 510).

The mobile application may include the insight generator application and/or the mobile banking application described herein. The mobile application may be downloaded onto the computing device 110 from a mobile application store.

The mobile application, once downloaded onto the computing device 110, enables or allows communication between the server computer system 120 and the computing device 110 and in this manner the computing device 110 may communicate data to the server computer system 120.

In one or more embodiments, the computing device 110 may connect to an onboard system of a vehicle, such as for example the onboard system 150 of the vehicle 140 described herein. In one or more embodiments, the computing device 110 may connect to the onboard system 150 of the vehicle 140 using a short range wireless communication protocol such as for example Bluetooth™ or near-field communications (NFC) or may connect to the onboard system 150 using a cable such as a Lightning™ cable or a universal serial bus (USB) cable.

Once connected, an icon associated with the insight generator application may be displayed on the display screen of the vehicle 140. A user may access the insight generator application by performing, for example, a tap gesture at a location on the display screen of the vehicle 140 that corresponds to the location of the icon associated with the insight generator application. In response, the computing device 110 may open the insight generator application and may cause the display screen of the vehicle 140 to display one or more graphical user interfaces associated with the insight generator application.

The method 500 includes obtaining, from an onboard system of a vehicle, vehicle data (step 520).

Once the computing device 110 is connected to the onboard system 150 of the vehicle 140, the computing device 110 may obtain vehicle data therefrom. The computing device 110 may communicate the vehicle data to the server computer system 120. It will be appreciated that the computing device 110 may filter or pre-process the vehicle data prior to communicating the vehicle data from the server computer system 120.

The vehicle data may be obtained directly from the onboard system 150 of the vehicle 140 or may be obtained by way of an application programming interface (API) associated with the onboard system 150 of the vehicle 140. The API may allow the computing device 110, specifically the insight generator application, to communicate with the onboard system 150 of the vehicle 140. For example, the computing device 110 may send an API request to the onboard system 150 of the vehicle 140 that requests the vehicle data. In response, the onboard system 150 of the vehicle 140 may retrieve the requested vehicle data and may communicate the vehicle data to the computing device 110.

In one or more embodiments, the computing device 110 may require an access token to request the vehicle data. In one or more embodiments, the access token allows the computing device 110, specifically the insight generator application, to securely make the API request, authorize connectivity to the onboard system 150 of the vehicle 140, and interact with the onboard system 150 of the vehicle 140.

The vehicle data may include at least one of fuel data, diagnostic data, sensor data, location data, charging data or driving data.

The fuel data may include, for example, fuel consumption, an amount of fuel left in the tank, a prediction for how long the vehicle can drive until fuel is required, etc.

The diagnostic data may include, for example, data that is used by the onboard system of the vehicle to self-diagnose one or more systems of the vehicle. The diagnostic data may be generated in response to a vehicle diagnostic test that scans components and integrated systems for errors or malfunctions. The diagnostic data may identify one or more components or systems that require maintenance, attention, etc.

The sensor data may include, for example, data that is obtained from one or more of the sensors of the onboard system of the vehicle. Examples include an air-flow sensor, engine knock sensor, engine speed sensor, camshaft position sensor, Manifold Absolute Pressure (MAP) sensor, throttle position sensor, voltage sensor, oxygen sensor, NOx sensor, temperature sensor, fuel temperature sensor, speed sensor, parking sensor, rain sensor, etc. The sensor data may additionally include odometer data that measures the total distance travelled by the vehicle.

The location data may include, for example, data identifying a current location of the vehicle and/or data that shows a history of vehicle travel.

The charging data may be specific to electric vehicles and may include, for example, vehicle charging data such as for example the time of the last charge or full charge of the vehicle, a current battery level of the vehicle, a prediction for how long the vehicle can drive until a charge is required, etc.

The driving data may include driving behavior data, for example, The driving data may be for the vehicle or may be specific to a particular driver of the vehicle and this may be identified, for example, based on what key is being used to operate the vehicle.

It will be appreciated that the vehicle data may include other types of data that may be obtained from the onboard system of the vehicle.

As mentioned, the vehicle data may be obtained by the computing device 110 and communicated to the server computer system 120.

The method 500 includes obtaining insight data based on at least some of the vehicle data (step 530).

The server computer system 120 may analyze the vehicle data to determine the insight data that may be required to generate at least one insight. The insight data may be related to the vehicle data.

The server computer system 120 may obtain the insight data from one or more third party server computer systems. For example, the server computer system 120 may send, to a third party server computer system, at least some of the vehicle data and may request the insight data. In response, the third party server computer system may analyze the vehicle data, generate the insight data, and send the insight data to the server computer system 120. The server computer system may receive, from the third party system, the insight data.

The server computer system 120 may obtain the insight data directly from the third party server computer system or may obtain the insight data by way of an application programming interface (API) associated with the third party server computer system.

The insight data may be for at least one upcoming event for the vehicle. The upcoming event may include an event that is required to maintain proper operation of the vehicle. In these embodiments, the server computer system 120 may analyze the vehicle data to identify at least one upcoming event for the vehicle. The server computer system 120 may obtain the insight data based on the at least one upcoming event for the vehicle.

In one or more embodiments, the at least one upcoming event for the vehicle may include at least one financial event for the vehicle. The at least one financial event for the vehicle may include one or more events that require a financial commitment from the user or operator of the vehicle. The at least one financial event may include, for example, paying for gas, paying for an oil change, paying to charge the vehicle, paying to service the vehicle, etc.

In embodiments where the at least one upcoming event for the vehicle includes at least one financial event for the vehicle, the insight data may include an estimated cost of the at least one financial event. The server computer system 120 may obtain the estimated cost of the at least one financial event from one or more third party server computer systems.

In one example, the server computer system 120 may analyze the vehicle data to identify that the vehicle may require fuel or gasoline. As such, the at least one upcoming event for the vehicle may include a financial event that requires filling the vehicle up with fuel or gasoline. In this example, the server computer system 120 may determine that the insight data that is required to generate at least one insight includes a cost to fill the vehicle up with fuel or gasoline. As such, the server computer system 120 may communicate with one or more third party server computer systems to obtain a cost to fill the vehicle up. Specifically, the server computer system 120 may estimate an amount of fuel required to fill the vehicle up and this may be done based on the vehicle data. The server computer system 120 may also determine a type or grade of fuel required. The server computer system 120 may send a request for the insight data that includes the amount of fuel required and the grade of the fuel required to one or more third party server computer systems. The server computer system 120 may then receive, from the one or more third party server computer systems, the insight data. The insight data may include a cost to fill up the vehicle.

It will be appreciated that in the above example, the server computer system 120 may alternatively request insight data that identifies the cost of gasoline from the third party computer system. The server computer system 120 may receive the cost of gasoline and may calculate the cost to fill up the vehicle. Put another way, rather than receiving the cost to fill up the vehicle from the third party server computer system, the server computer system 120 may calculate the cost to fill up the vehicle based on the cost of gasoline received from the third party server computer system.

In one or more embodiments, the server computer system 120 may obtain insight data from multiple third party server computer systems and may analyze the insight data to make a decision for the insight. For example, in the above example where the vehicle requires gasoline, the server computer system 120 may analyze the vehicle data to identify a location of the vehicle and may obtain the cost to fill up the vehicle from multiple gas stations located within proximity of the vehicle. In this manner, the server computer system 120 may determine the cheapest nearby gas station to fill the vehicle up with gasoline.

The method 500 includes generating at least one insight based on at least one of the insight or the vehicle data (step 540).

The server computer system 120 generates the at least one insight based on at least one of the insight data or the vehicle data.

The at least one insight may be generated automatically in response to the server computer system 120 obtaining the vehicle data. For example, the server computer system 120 may analyze the vehicle data to identify at least one upcoming event for the vehicle, may obtain the insight data, and may automatically generate the at one insight.

The at least one insight may additionally or alternatively be generated at the request of a user or driver of the vehicle. For example, the user may select a selectable option displayed on a display screen of the vehicle that requests that at least one insight be generated. In one example, the at least one insight may be associated with determining an estimated value of the vehicle. In this example, the user may select a selectable option for determining an estimated value of the vehicle. In response, the server computer system 120 may obtain vehicle data that includes an odometer reading of the vehicle and vehicle information such as a make and model of the vehicle. The server computer system 120 may send a request for insight data, specifically a request for the estimated value of the vehicle, to a third party server computer system. The request may include the vehicle data. The server computer system 120 may obtain the insight data and in this manner the at least one insight may be generated at the request of the user.

In one or more embodiments, the at least one insight may include a recommendation to a user or driver of the vehicle and this may be based on the insight data or the vehicle data. For example, the at least one insight may include a recommendation to fill the vehicle up with gasoline and may include an estimated cost to fill the vehicle up with gasoline. In one or more embodiments, the estimated cost to fill the vehicle up with gasoline may be based on the insight data. In one or more embodiments, the insight may include multiple options for the user. For example, the insight may include a list of two or more gas stations that are located within proximity of the vehicle and may include the cost to fill the vehicle up with gasoline at each one of the gas stations.

The at least one insight may be generated based on at least one upcoming event for the vehicle and the insight data based on the at least one upcoming event for the vehicle. For example, the server computer system 120 may determine at least one upcoming event for the vehicle that includes a financial event for the vehicle. The server computer system 120 may obtain insight data that includes an estimated cost of the at least one financial event for the vehicle. The server computer system 120 may generate the insight to display the estimated cost of the at least one financial event for the vehicle.

Some examples of at least one insight that may be generated may include at least one of an oil change for the vehicle, an upcoming service for the vehicle, charging the vehicle, filling the vehicle up with gasoline, or selling the vehicle and the insight data is associated with an estimated cost of the at least one insight.

The method 500 includes triggering display of the at least one insight on a display screen of the vehicle (step 550).

The server computer system 120 communicates with the computing device 110 to trigger the display of the at least one insight on the display screen of the vehicle. Specifically, the computing device 110 may communicate with the onboard system of the vehicle and may provide one or more graphical user interfaces to be displayed on the display screen of the vehicle. The one or more graphical user interfaces may include at least one graphical user interface that includes the at least one insight.

In one or more embodiments, the server computer system 120 may engage a machine learning module to customize the display of the at least one insight. For example, the server computer system 120 may generate two or more insights and the machine learning module may determine which insight to be displayed first based on historical interactions with the user. As another example, the server computer system 120 may determine multiple options for a particular insight and the machine learning module may determine the option most likely to be selected by the user by analyzing historical resource data of the user. In this example, the server computer system 120 may identify two or more gas stations for filling up the vehicle and may only present one of the gas stations and this may be based on the user typically purchasing gas at a particular gas station or may be based on the user typically selecting the gas station with the cheapest price of the gas station that is closest to the vehicle.

In one or more embodiments, the display of the at least one insight may include at least one selectable option. The at least one selectable option, when selected, may cause the server computer system 120 to perform one or more operations. For example, the at least one insight may include filling up the vehicle with gasoline and may include a selectable option that, when selected, causes the server computer system 120 to engage an application programming interface (API) to provide directions to the recommended gas station. Other examples of operations that may be performed by the server computer system 120 include initiating a telephone call to a dealership or service center to schedule an appointment, engaging a scheduling module or a scheduling API to automatically schedule an appointment, engaging a calendar API to determine availability and to insert a scheduled appointment into a calendar associated with the user, modify one or more data records to integrate the estimated cost of at least one financial event into a resource budget, etc.

As mentioned, in one or more embodiments, the vehicle data may be analyzed to identify at least one financial event and the server computer system 120 may obtain insight data that includes an estimated cost of the at least one financial event. In these embodiments, the server computer system 120 may integrate the estimated cost into a resource budget based on resource data maintained by a database associated with the server computer system 120.

In one or more embodiments, the server computer system 120 may engage a machine learning module that may be used to generate a resource budget based on the resource data. The machine learning module may be trained using training data that includes historical resource data for one or more resource accounts. Specifically, the machine learning module may analyze the historical resource data to generate a resource budget for a user. The resource budget may include estimates for spending one or more spending categories such as for example housing, vehicle, groceries, restaurants, etc.

In one or more embodiments, the estimated cost of the at least one financial event for the vehicle may be included in or integrated into the vehicle spending category. For example, the vehicle spending category may include monthly payments for the vehicle, insurance payments for the vehicle, etc. The machine learning module may be engaged to estimate expected fuel costs for the vehicle and this may be based on the vehicle data, for example. The expected fuel costs may be integrated into the vehicle spending category. Further, in embodiments where the at least one financial event includes an upcoming service for the vehicle, the estimated cost for the upcoming service for the vehicle may be integrated into the vehicle spending category. In this manner, the vehicle data may be used to generate financial insights that may be integrated into a resource budget for the user.

In one or more embodiments, the server computer system 120 may perform operations to schedule the at least one upcoming event. For example, the server computer system 120 may generate at least one insight that includes an oil change for the vehicle and a cost of the oil change for the vehicle. The display of the at least one insight on the display screen of the vehicle may include a selectable option to book an appointment for the oil change. Responsive to selection of the selectable option, the server computer system 120 may communicate with a third party server computer system to book the service. In one or more embodiments, the server computer system 120 may utilize machine learning to schedule the appointment based on times and dates that the user has previously booked. In one or more embodiments, the server computer system 120 may access a calendar of the user to identify an available time slot for the service and may enter the booked time slot into the calendar.

Examples of insights and the associated display of the insights will now be described with reference to FIGS. 6 to 13.

Figure 6:
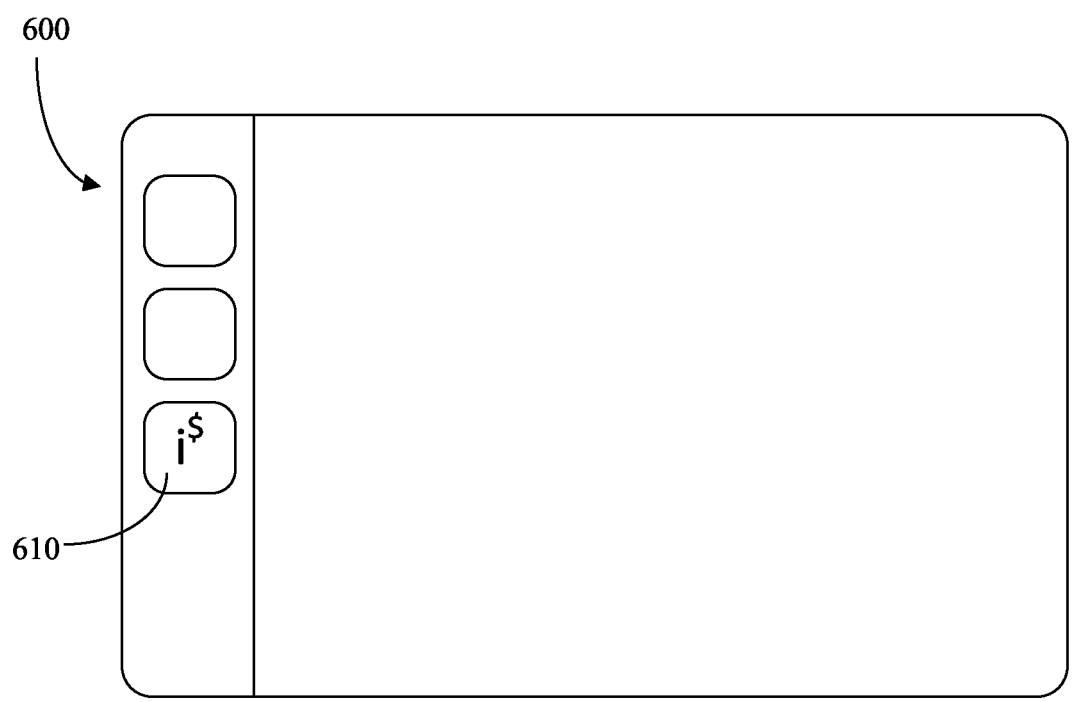
FIGS. 6 to 13 are example graphical user interfaces displayed on a display screen of a vehicle.

FIG. 6 includes an example graphical user interface 600 that includes an icon 610 associated with the insight generator application displayed on a display screen of a vehicle. A user may access the insight generator application by performing, for example, a tap gesture at a location on the display screen of the vehicle that corresponds to the location of the icon associated with the insight generator application. In response, the computing device may open the insight generator application and may cause the display screen of the vehicle to display one or more graphical user interfaces associated with the insight generator application.

Figure 7:
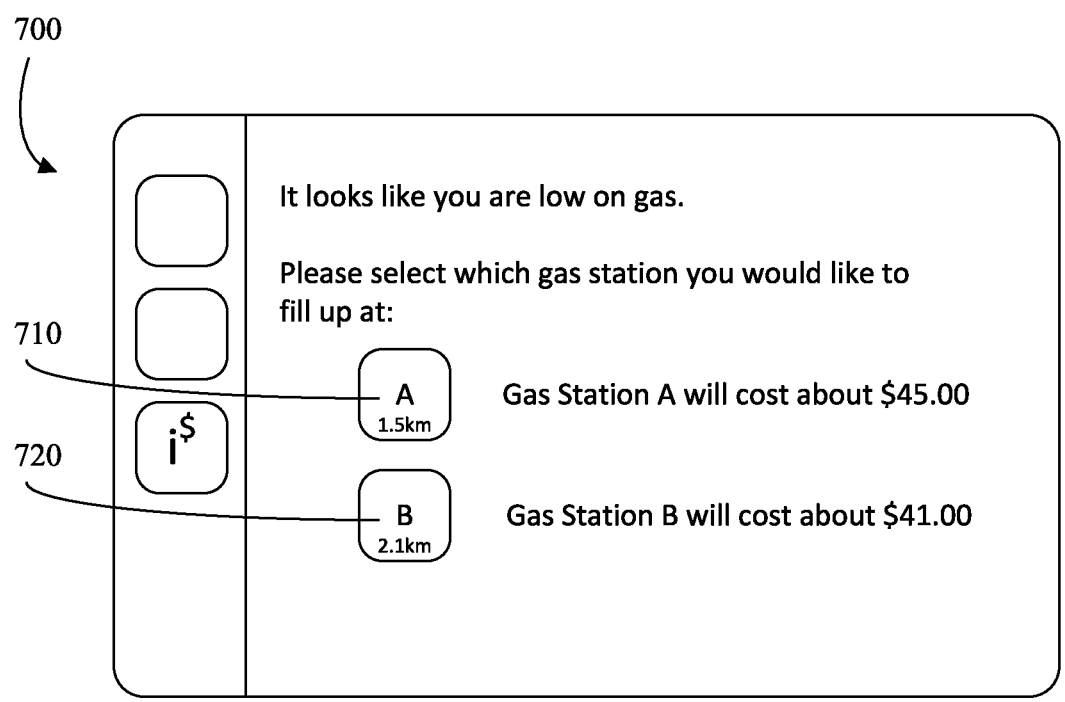

FIG. 7 includes an example graphical user interface 700 that includes an insight generated by the server computer system 120. The insight is for filling up the vehicle with gas and includes two options for gas stations. A first icon 710 is displayed that is associated with filling up with gas from "Gas Station A" and a second icon 720 is displayed that is associated with filling up with gas from "Gas Station B". The graphical user interface 700 displays the insight data, specifically the cost for filling up with gas at each gas station. The first icon 710 and the second icon 720 are selectable and, when selected, may cause the server computer system 120 to engage an API to provide driving directions to the associated gas station.

Figure 8:
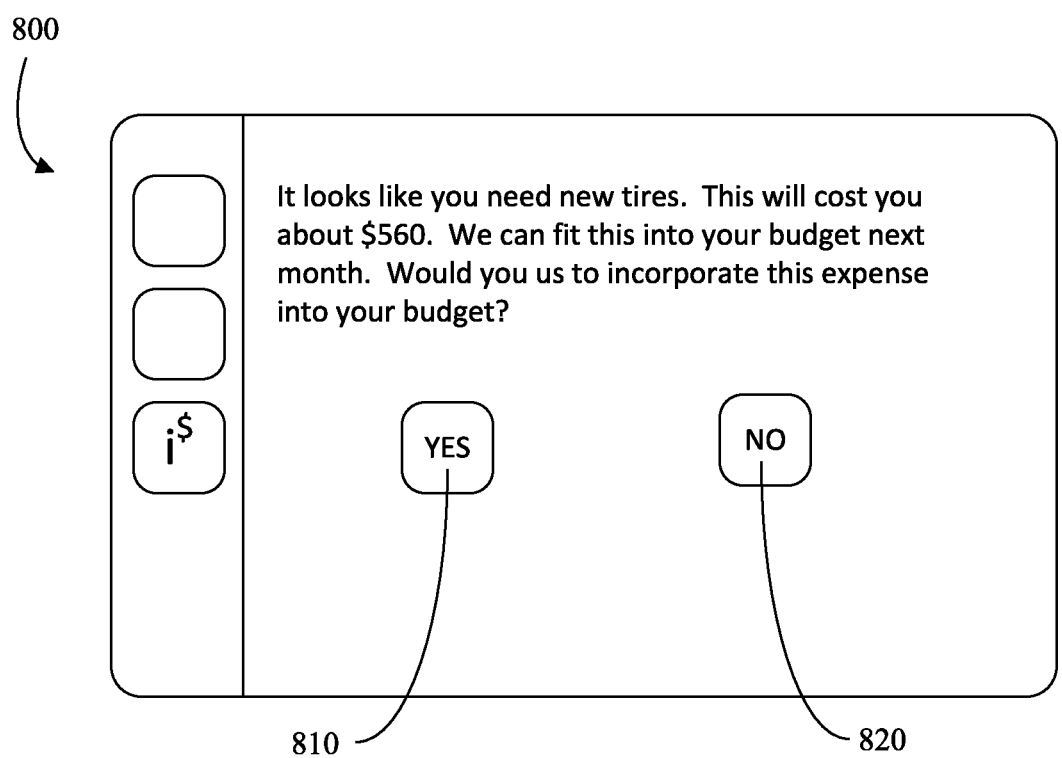
Figure 9:
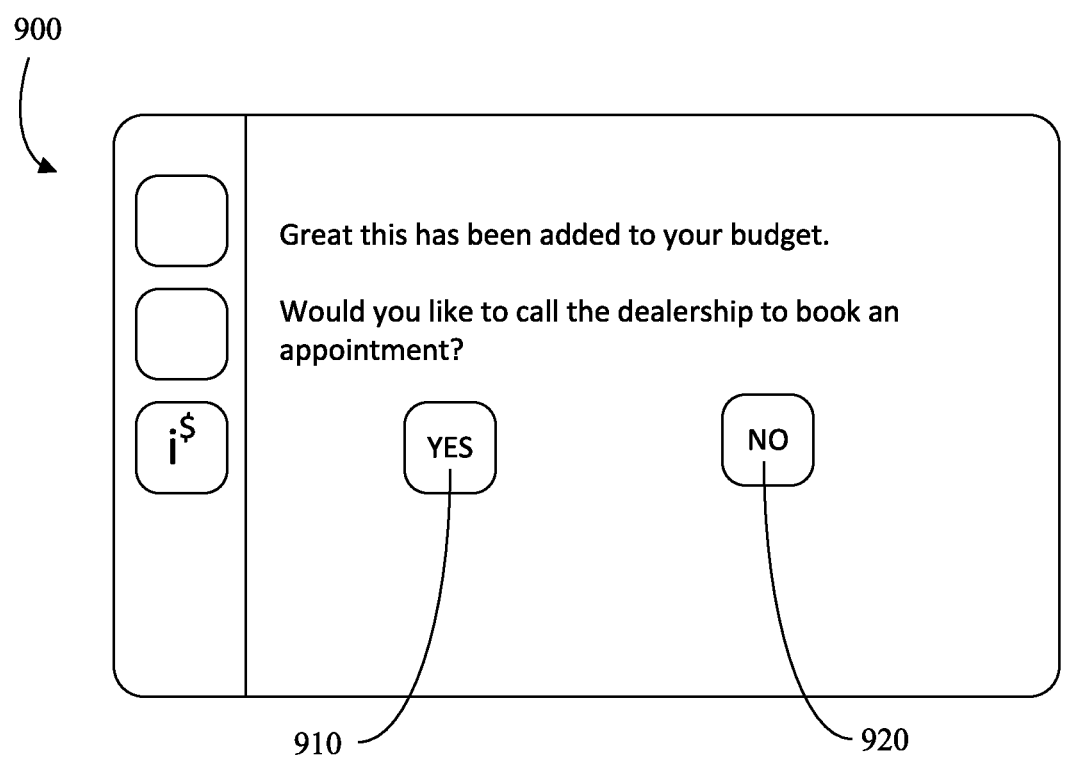
Figure 10:
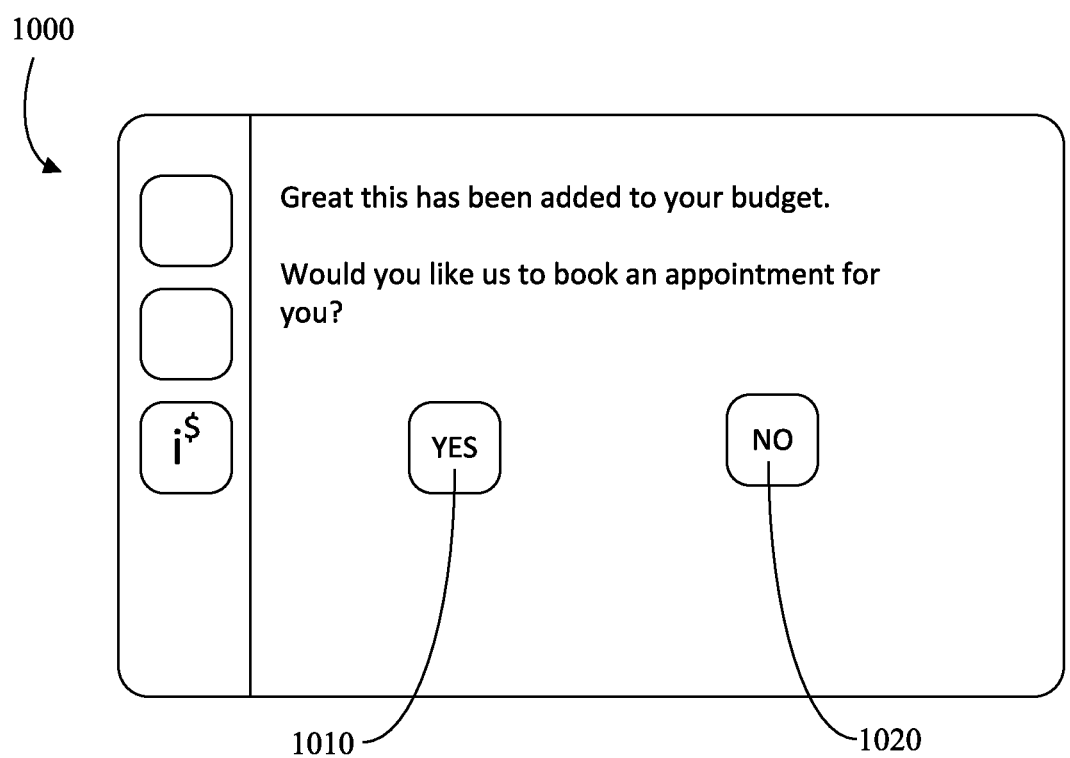

FIG. 8 includes an example graphical user interface 800 that includes an insight generated by the server computer system 120. The insight is for servicing the vehicle, specifically purchasing new tires. The insight may be generated in response to the sensor data indicating that the treads on the tires are reaching a threshold level. The graphical user interface 800 includes a first selectable option 810 for incorporating the financial event into the resource budget and a second selectable option 820 for not incorporating the financial event into the resource budget. The insight includes a recommendation to fit the financial event into the budget for the next month.

The user may select the first selectable option 810 for incorporating the financial event into the resource budget. In one example, in response, the graphical user interface may be updated as the graphical user interface 900 shown in FIG. 9. As can be seen, the graphical user interface 900 includes a prompt asking the user if they would like to call the dealership to book an appointment. The graphical user interface 900 includes a first selectable option 910 for calling a dealership to book an appointment and a second selectable option 920 indicating that the user does not want to call the dealership to book an appointment. Selection of the first selectable option 910 may initiate a phone call between the computing device 110 and the dealership.

Referring back to FIG. 8, the user may select the first selectable option 810 for incorporating the financial event into the resource budget. In one example, in response, the graphical user interface may be updated as the graphical user interface 1000 shown in FIG. 10. As can be seen, the graphical user interface 1000 includes a prompt asking the user if they would like the server computer system 120 to book an appointment. The graphical user interface 1000 includes a first selectable option 1010 for requesting that the server computer system 120 book an appointment and a second selectable option 1020 indicating that the user does not want the server computer system 120 to book an appointment. Selection of the first selectable option 1010 may cause the server computer system 120 to perform operations to book the appointment and this may be done in manners similar to that described herein.

Figure 11:
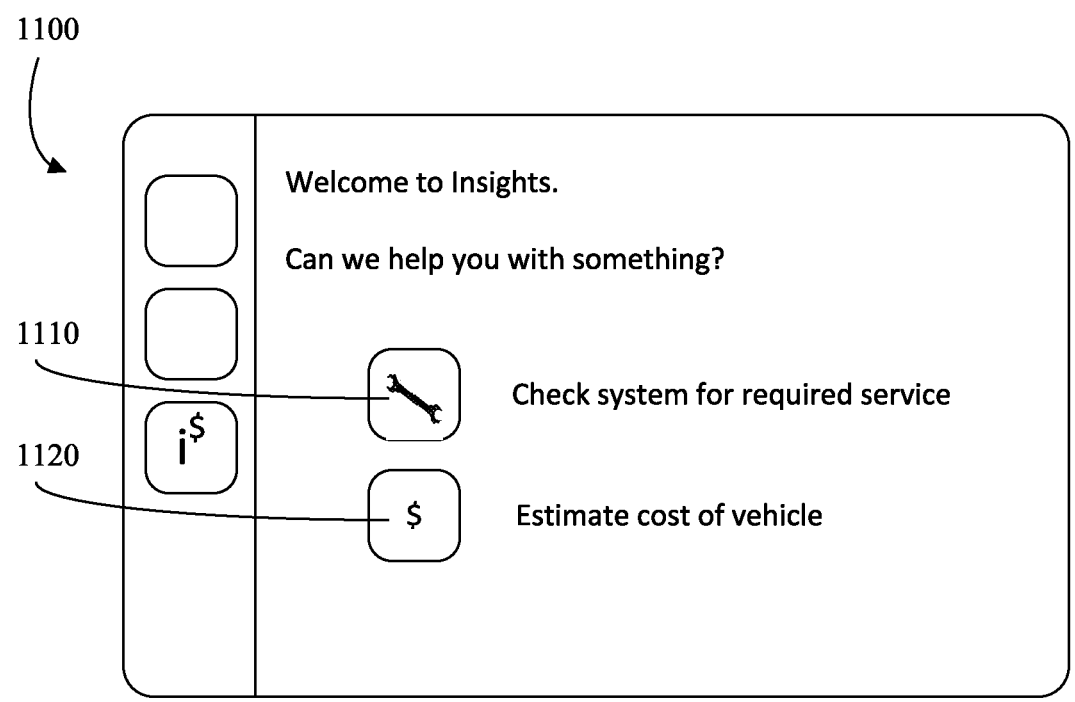

FIG. 11 includes a graphical user interface 1100 that may be used to request that the server computer system 120 generate one or more insights. The graphical user interface 1100 includes a first selectable option 1110 for requesting that the server computer system 120 check the vehicle for required service and a second selectable option 1120 for estimating the cost of the vehicle. Selection of the first selectable option 1110 or the second selectable option 1120 may cause the server computer system 120 to perform one or more operations of the method 500 described herein to generate and display one or more insights based on vehicle data.

Figure 12:
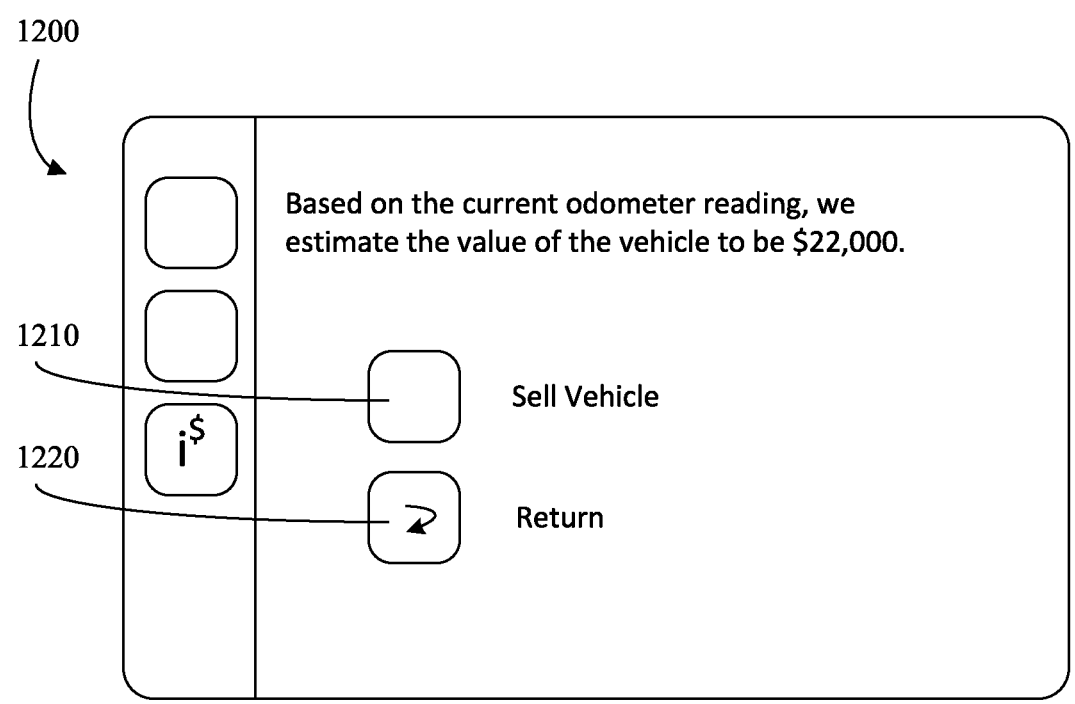

In the example shown in FIG. 11, selection of the second selectable option 1120 may cause the server computer system 120 to perform operations to estimate the cost of the vehicle. An example graphical user interface 1200 that includes the estimated cost of the vehicle is shown in FIG. 12. As can be seen, the graphical user interface 1200 indicates the estimated cost of the vehicle and includes a first selectable option 1210 for initiating selling of the vehicle and a second selectable option 1220 for returning back to the graphical user interface 1100. In one or more embodiments, initiating selling of the vehicle may cause the server computer system 120 to send an email to the user that includes a selectable link to post the vehicle on one or more websites for selling vehicles, for example. As another example, initiating selling of the vehicle may cause the server computer system 120 to send an email to a car dealership indicating that the user would like to sell the vehicle and indicating the estimated cost of the vehicle.

Figure 13:
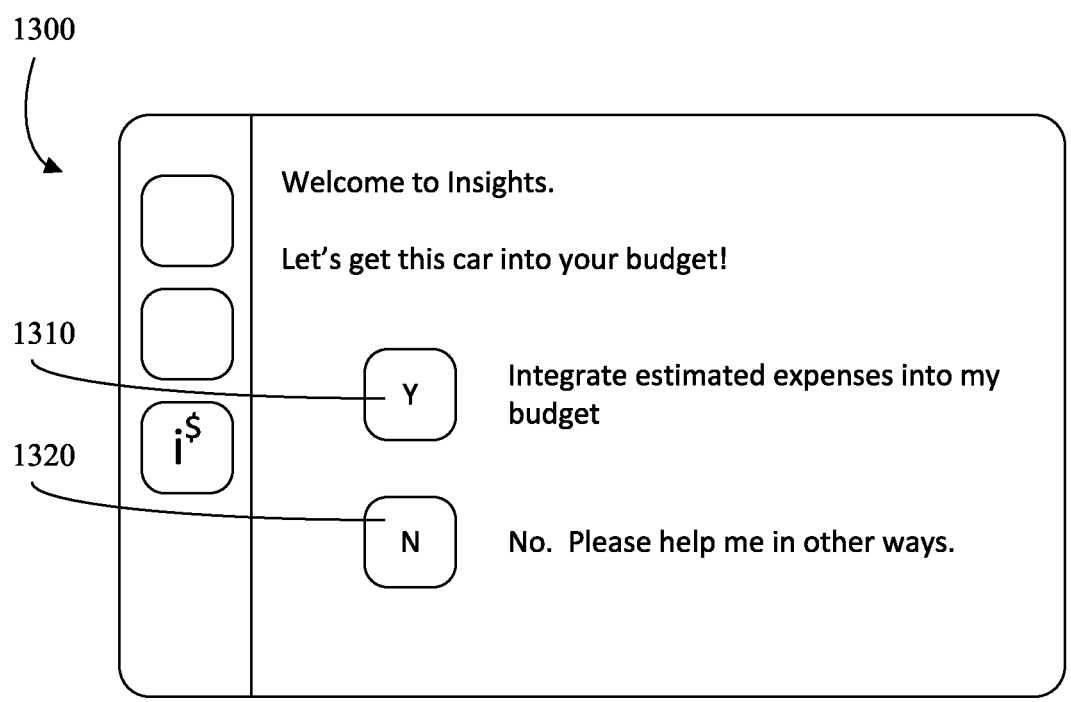

FIG. 13 includes a graphical user interface 1300 that may be used to request that the server computer system 120 integrate estimated expenses into a resource budget. The graphical user interface 1300 includes a first selectable option 1310 for requesting that the server computer system 120 integrate estimated expenses into a resource budget and a second selectable option 1120 for requesting more information as to how the insight generator application may be used to generate insights. Selection of the first selectable option 1310 may cause the server computer system 120 to perform one or more operations to integrate estimated expenses into a resource budget. For example, the server computer system 120 may perform one or more operations of the method 500 described herein to generate one or more insights based on vehicle data and to integrate any identified financial events into a resource budget of the user.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the above discussed embodiments are considered to be illustrative and not restrictive.

What is claimed is:

1. A server computer system comprising:
a communications module;
at least one processor coupled to the communications module; and
a memory coupled to the at least one processor, the memory storing processor-executable instructions which, when executed by the at least one processor, configure the at least one processor to:
provide a mobile application to a computing device that allows communication with the computing device to:
obtain, from an onboard system of a vehicle, vehicle data;
obtain insight data based on at least some of the vehicle data;
generate at least one insight based on at least one of the insight data or the vehicle data;
engage a machine learning module trained on historical vehicle and resource usage data to estimate a cost for the at least one insight;
automatically update a resource budget stored in memory of the server computer system based on the estimated cost; and
trigger real-time display of the at least one insight and the estimated cost for the at least one insight on a display screen of the vehicle.

2. The server computer system of claim 1, wherein when obtaining the insight data, the instructions, when executed by the at least one processor, configure the at least one processor to:
send, via the communications module and to a third party server computer system, the at least some of the vehicle data and a request for the insight data; and
receive, via the communications module and from the third party server computer system, the insight data.

3. The server computer system of claim 2, wherein the server computer system communicates with the third party server computer system by way of an application programming interface associated with the third party server computer system.

4. The server computer system of claim 1, wherein the instructions, when executed by the at least one processor, configure the at least one processor to:
analyze the vehicle data to identify at least one upcoming event for the vehicle; and
obtain the insight data based on the at least one upcoming event for the vehicle.

5. The server computer system of claim 4, wherein the at least one upcoming event for the vehicle includes at least one financial event for the vehicle and the insight data includes the estimated cost.

6. The server computer system of claim 5, wherein the instructions, when executed by the at least one processor, configure the at least one processor to:

integrate the estimated cost into the resource budget based on resource data maintained by a database associated with the server computer system.

7. The server computer system of claim 4, wherein the instructions, when executed by the at least one processor, configure the at least one processor to:
generate the at least one insight based on the at least one upcoming event for the vehicle and the insight data based on the at least one upcoming event for the vehicle.

8. The server computer system of claim 1, wherein the instructions, when executed by the at least one processor, configure the at least one processor to:
analyze the vehicle data to identify a location of the vehicle; and
generate the at least one insight based on the location of the vehicle.

9. The server computer system of claim 1, wherein the display of the at least one insight on the display screen of the vehicle includes at least one selectable option that, when selected, causes the server computer system to perform an action.

10. The server computer system of claim 1, wherein the vehicle data includes at least one of fuel data, diagnostic data, sensor data, location data, charging data, or driving data.

11. The server computer system of claim 1, wherein the at least one insight includes at least one of an oil change for the vehicle, an upcoming service for the vehicle, charging the vehicle, filling the vehicle up with gasoline, or selling the vehicle.

12. A computer-implemented method performed by at least one processor of a computer server system, the method comprising:
providing a mobile application to a computing device that allows communication with the computing device to perform:
obtaining, from an onboard system of a vehicle, vehicle data;
obtaining insight data based on at least some of the vehicle data;
generating at least one insight based on at least one of the insight data or the vehicle data;
engaging a machine learning module trained on historical vehicle and resource usage data to estimate a cost for the at least one insight;
automatically updating a resource budget stored in memory of the computer server system based on the estimated cost; and
triggering real-time display of the at least one insight and the estimated cost for the at least one insight on a display screen of the vehicle.

13. The computer-implemented method of claim 12, wherein when obtaining the insight data, the method further comprises:
sending, to a third party server computer system, the at least some of the vehicle data and a request for the insight data; and
receiving, from the third party server computer system, the insight data.

14. The computer-implemented method of claim 13, wherein the server computer system communicates with the third party server computer system by way of an application programming interface associated with the third party server computer system.

15. The computer-implemented method of claim 12, further comprising:
analyzing the vehicle data to identify at least one upcoming event for the vehicle; and
obtaining the insight data based on the at least one upcoming event for the vehicle.

16. The computer-implemented method of claim 15, wherein the at least one upcoming event for the vehicle includes at least one financial event for the vehicle and the insight data includes the estimated cost.

17. The computer-implemented method of claim 16, further comprising:
integrating the estimated cost into the resource budget based on resource data maintained by a database associated with the server computer system.

18. The computer-implemented method of claim 15, further comprising:
generating the at least one insight based on the at least one upcoming event for the vehicle and the insight data based on the at least one upcoming event for the vehicle.

19. The computer-implemented method of claim 12, wherein the display of the at least one insight on the display screen of the vehicle includes at least one selectable option that, when selected, causes the server computer system to perform an action.

20. A non-transitory computer readable storage medium comprising computer-executable instructions which, when executed, configure at least one processor of a server computer system to:
provide a mobile application to a computing device that allows communication with the computing device to:
obtain, from an onboard system of a vehicle, vehicle data;
obtain insight data based on at least some of the vehicle data;
generate at least one insight based on at least one of the insight data or the vehicle data;
engage a machine learning module trained on historical vehicle and resource usage data to estimate a cost for the at least one insight;
automatically update a resource budget stored in memory of the server computer system based on the estimated cost; and
trigger real-time display of the at least one insight and the estimated cost for the at least one insight on a display screen of the vehicle.

* * * * *